United States Patent [19]
van Dorsselaer et al.

[11] Patent Number: 5,343,283
[45] Date of Patent: Aug. 30, 1994

[54] SCAN/PRINT SYSTEM FOR PERFORMING IMAGE PROCESSING AND AN IMAGE SELECTION UNIT FOR USE IN THE SCAN/PRINT SYSTEM

[75] Inventors: Etienne L. M. E. van Dorsselaer, El Sintjansteen; Johannes P. H. Oyen, BL Swalmen, both of Netherlands

[73] Assignee: OCE-Nederland, B.V., Venlo, Netherlands

[21] Appl. No.: 836,360

[22] Filed: Feb. 18, 1992

[30] Foreign Application Priority Data

Feb. 18, 1991 [NL] Netherlands ............... 9100275

[51] Int. Cl.$^5$ ............................................. H04N 1/40
[52] U.S. Cl. ......................... 358/445; 358/455; 358/456
[58] Field of Search ............ 358/445, 447, 448, 455, 358/456, 457, 458, 298; 382/50, 54; H04N 1/40

[56] References Cited

U.S. PATENT DOCUMENTS

| | | |
|---|---|---|
| 4,194,221 | 3/1980 | Stoffel . |
| 4,288,821 | 9/1981 | Lavallee et al. ............. 358/456 |
| 4,707,745 | 11/1987 | Sakano . |
| 4,742,400 | 5/1988 | Tsuji . |
| 4,782,399 | 11/1988 | Sato . |
| 4,856,075 | 8/1989 | Smith ............................ 382/50 |
| 4,953,114 | 8/1990 | Sato ............................. 382/54 |
| 5,010,497 | 4/1991 | Shimada ........................ 358/455 |
| 5,014,333 | 5/1991 | Miller et al. .................. 382/54 |
| 5,138,672 | 8/1992 | Hirabayashi et al. .......... 382/54 |

FOREIGN PATENT DOCUMENTS

0291000 11/1988 European Pat. Off. .
0318950 6/1989 European Pat. Off. .
0361880 4/1990 European Pat. Off. .

OTHER PUBLICATIONS

Digital Halftoning, R. Ulichney, 1987, MIT Press, Cambridge, at chapter 9, pp. 334–335.

Primary Examiner—Edward L. Coles, Sr.
Assistant Examiner—Kim Yen Vu
Attorney, Agent, or Firm—Birch, Stewart, Kolasch & Birch

[57] ABSTRACT

Method of processing photoelectrically scanned image information representing different gray values, before such information is converted, by half-tone processing, into image information representing no more than two gray values, such that the scanned information is distinguished into different categories of information, each category being subjected to a filtering operation determined by the category, the information thus filtered for each category being suitable for subjecting to one type of half-tone processing.

22 Claims, 5 Drawing Sheets

SCAN/PRINT SYSTEM FOR PERFORMING IMAGE PROCESSING AND AN IMAGE SELECTION UNIT FOR USE IN THE SCAN/PRINT SYSTEM

BACKGROUND OF THE INVENTION

1. Field of the Invention

The present invention relates to a scan/print imaging system and, more specifically, to a method and apparatus of processing a series of image signals obtained by photoelectrically scanning a document.

2. Discussion of Related Art

As discussed in U.S. Pat. No. 4,742,400, a digital copying machine contains a printing unit in the form of a laser printer capable of printing two gray value levels at most. A scanning unit delivers image signals corresponding to image dots and capable of representing 64 gray value levels. To obtain binary image signals suitable for the laser printer, a conversion operation is carried out in which multi-value image signals are converted to binary image signals so as to produce a print corresponding to the original gray value as far as the eye is concerned.

The known instant apparatus comprises an image processing unit which generates a first group of binary image signals which are obtained after a conversion operation in which a number of image dots corresponding to the required gray value are arranged to a fixed pattern in a matrix of $8 \times 8$ image dots. This process is frequently termed dithering. A disadvantage of dithering, however, is that sharp transitions in a scanned image, for example in the case of letters or lines, are unsharp in the finished print due to the resolution-lowering effect of the matrix used. With such image information it is preferable to use a conversion operation based on thresholding per image dot and not per matrix of image dots. However, if letters or lines can assume different gray values, as is the case, for example, with colored texts, or if the background is colored, dithering with a matrix with fewer image dots may be an acceptable compromise. In the known apparatus, the image processing unit accordingly generates a second group of binary image signals obtained by a conversion operation in accordance with this principle. For this purpose, the image processing unit comprises an averaging unit which averages image dots over a submatrix of $2 \times 2$ and a submatrix unit which again subjects these average values to a dithering operation with an $8 \times 8$ matrix. In this way, reasonable edge sharpness is maintained while at the same time no gray value is completely lost.

Another disadvantage of dithering is the interference by the dither matrix with raster patterns resulting in moiré effects in the print. In such cases it is better to use a conversion operation based on the known error diffusion algorithm. In this case thresholding is carried out per image dot and the rounding-off error made is passed to one or more neighboring image dots.

Where more than one conversion operation is used to convert multi-value signals to binary signals, as is the case in the known apparatus, it is necessary to select the image signals as to information content such as text or photographs. On the basis of such a selection the image signals can be selectively converted by one of the conversion operations or the image signals generated by the different conversion operations can be chosen selectively, depending on the image information represented by the image signals. In the known image processing unit, the selection means makes a selection of image signals from one of the two groups of binary image signals, the selection being determined, per image area, by the size of edge transitions in the image area. The selected binary image signals are then fed via the switching means to the laser printer.

However, an error may occur during the selection process in selecting a non-optimal group of binary signals so that the final print may, undoubtedly locally, be of a poorer quality than the original. The occurrence of an error in the selection may result, for example, in the case of weak information, as is the case, for example, with low-contrast letters or lines. Also, in an image area with image information in which the selection takes place right against a selection threshold, minor variations in image information may result in highly varying selections. A uniform character of an image area may be disturbed as a result. Also, image areas with image information increasing or decreasing uniformly with respect to spatial frequency, for example, may have an abrupt transition due to another selection occurring at a specific frequency.

SUMMARY OF THE INVENTION

Therefore, it is an object of the present invention to provide a scan/print imaging system which will overcome the above-noted disadvantages.

It is a further object of the present invention to provide a novel method of processing a series of image signals obtained by photoelectrically scanning a document.

Still, a further object of the present invention is to provide a novel scan/print imaging apparatus for processing a series of image signals obtained by photoelectric scanning of a document to be reproduced.

The foregoing objects and others are accomplished in accordance with the present invention, generally speaking, by providing an image processing method of processing a series of image signals obtained by photoelectrically scanning a document whereby a selection signal is generated with reference to the image signals obtained by scanning the document to be reproduced, each image signal representing the optical density of an image dot on the document. The value of the selection signal is dependant upon differences between the optical densities of neighboring or adjacent image dots. At least two mutually different image processing operations on a series of image signals yield, respectively, a group of processed image signals. With reference to the selection signal, processed image signals from one of the group of processed image signals are selected.

The at least two image processing operations are image filtering operations and the processed image signals are filtered image signals, the selected filtered image signals being subjected to one and the same conversion operation for converting multi-value image signals into binary raster signals suitable for printing by a printing device. Consequently, a selection is made from the image signals filtered by the filtering operations in contrast to a selection from image signals converted by conversion operations. Since these selected filtered image signals are then subjected to one and the same conversion operation, the above-mentioned disadvantages associated with methods having more than one conversion operation no longer occur. Incorrect selections of conversion operations, in fact, can no longer be made. Since the image signals are first processed by an image filtering operation, they are better suited to being subjected to one and the same conversion unit. Any incorrect selection of an image filtering operation finally proves to be less disturbing than an incorrect selection of a conversion operation.

The present invention also relates to a scan/print system for performing the above image processing method. The scan/print system includes a scanning unit for obtaining the multi-value image signals by photoelectrically scanning the document to be reproduced, the value of each multi-value image signal representing the optical density of an image dot on the document, a print unit for printing binary image signals, and an image selection unit. The image selection unit includes an image processing unit for processing the series of multi-value image signals fed thereto, the image processing unit generating the at least two mutually different groups of processed image signals, selection means for generating the selection signal by reference to the multi-value image signals which are to be fed to the selection means, the value of the selection signal being dependent upon differences between optical densities of adjacent image dots, and switching means for selecting, by reference to the selection signal, the processed image signals from one of the two groups of processed image signals.

The image processing unit of the scan/print system is constructed as an image filtering unit and the generated processed image signals are filtered image signals, the selected filtered image signals being fed to one and the same conversion unit contained in the scan/print system, for converting multi-value image signals into binary image signals. Unlike the known apparatus, the image processing unit contains no conversion units performing conversion operations, but an image filtering unit generating different groups of filtered image signals. Consequently, there is a selection of image signals obtained by image filtering operations and not by conversion operations as in the known apparatus. The selected filtered image signals are then always fed to one and the same conversion unit. Different categories of image information, e.g. text and line information, gray value information or weak information, such as low contrast text and lines which cannot normally be subjected to one and the same conversion operation, now have to be so adapted or filtered by the different image filtering operations that this can now take place.

Various suitable image filtering operations are possible to this end. For the conversion operation a selection can be made from known conversion operations such as, for example, dithering or error diffusion. One possible method of performance is characterized in that at least one image filtering operation comprises successively an averaging operation and an edge sharpness enhancement operation. This image filtering operation is suitable for image areas where average contrast transitions occur. The averaging operation is used to suppress any high-frequency noise or raster while the edge sharpness enhancement operation is used to compensate for the blurring due to the averaging operation. The filtered image signals will now give less rise to the introduction of moiré effects or amplification of noise by the conversion operation.

Another method of performance is characterized in that at least one image filtering operation comprises successively an averaging operation and a non-linear edge sharpness enhancement operation. This image filtering operation is suitable for image areas where there is little or no contrast transition, for example low contrast lines or letters and very fine rasters. The most important object of this operation is accordingly to improve the contrast remaining after the averaging operation so that the information is not lost through the conversion operation. This is achieved by the non-linear edge sharpness enhancement operation.

A following method of performance is characterized in that at least one image filtering operation comprises an edge sharpness enhancement operation. This image filtering operation is suitable for image areas where there are strong contrast transitions, as is the case with sharply defined text, lines or course rasters. No spatial blurring may occur here so that there is no averaging operation in this case. To compensate for any spatial blurring due to the conversion operation the contrast transitions are given extra amplification.

In a scan/print apparatus in which the selection means comprises a low pass filter and edge detection means connected thereto, a suitable selection of image signals in combination with the filtering operations is obtained in that 1) the edge detection means generates edge signals which represent a maximum absolute difference in value of image signals fed to the edge detection means within a series, and 2) the selection means comprises a decision unit which generates the selection signal to which the edge signals are fed. The instant filtering operations can now be advantageously selected on the basis of these edge signals to be fed to the selection means.

BRIEF DESCRIPTION OF THE DRAWINGS

The method, the scan/print system and the image selection unit will be explained, together with the above and other advantages not yet mentioned, with reference to the accompanying drawings wherein.

DETAILED DISCUSSION OF THE INVENTION

Figure 1:
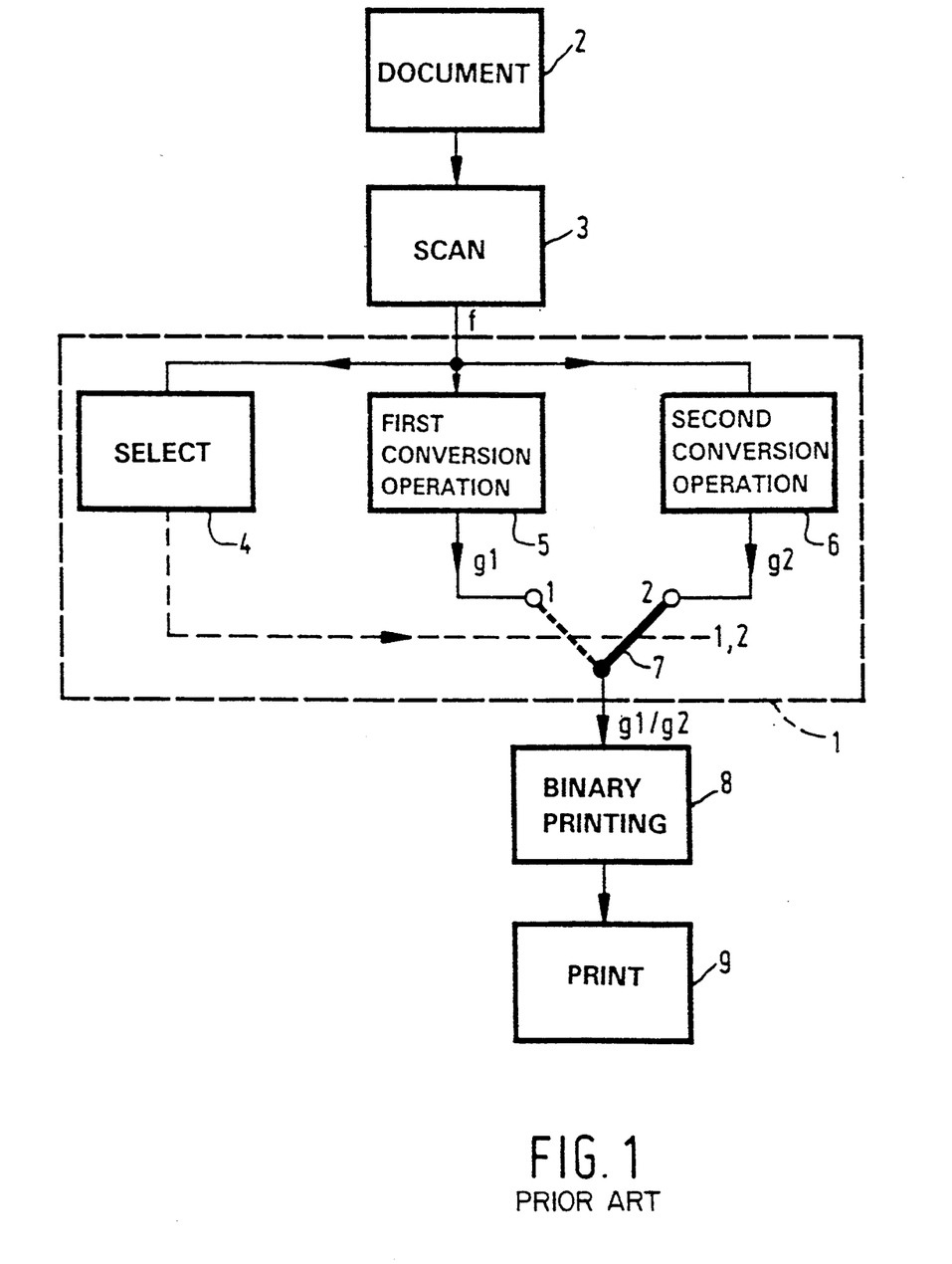
FIG. 1 represents a method according to the prior art for processing image information to give binary print signals.

FIG. 1 represents a method 1 known from the prior art for processing image information obtained by scanning so as to make the same suitable for printing at two intensity levels. The scanned image information is represented by image signals f obtained by photoelectrically scanning a document 2 in a scanning step 3, for example by means of a CCD array. In a digital method, the analog image signals are converted to digital image signals f via an analog-digital conversion step (not shown). In that case a number represented by a digital image signal f corresponds to the optical density or gray value of an image dot or pixel in the scanned document 2. The resolution in this case may, for example, be 400 dots per inch, while the grey value may, for example, reproduce 256 values (in the case of an 8-bit number). This method is found, for example, in document scanners used in facsimile systems or digital copying systems as described in U.S. Pat. No. 4,707,745.

The digital image signals f obtained are simultaneously subjected, possibly via digital buffer memories, to a selection step 4 and to a first and second conversion operation 5 and 6. The mutually different conversion operations 5 and 6, respectively, convert the multi-value image signals f, which for example represent 8-bit numbers, into binary raster signals g1 and g2 respectively, representing 1-bit numbers. In these conditions the raster signals g1 and g2 are then suited for being supplied to, for example, black and white printing devices, e.g. matrix, laser or LED printers. Conversion operations of this kind are also referred to as halftoning.

Various methods are known for conversion operations. A simple conversion operation is obtained just by thresholding with respect to a gray level. A gray value above this gray level or threshold is given the value 1 for example, and below that level the value 0. More advanced conversion operations are based on dithering and error diffusion as described, for example, in "Digital Halftoning" by Robert Ulichney, MIT Press 1987. A given conversion operation, however, is optimal only for a specific category of image information; for example, thresholding for text, dithering for photographs and error diffusion for rasters. For this reason use is frequently made of different conversion operations in which each conversion operation is applied only to image information optimal for the conversion operation.

In the known method according to FIG. 1, this is achieved by switching 7 in the selection step 4 between the first and second group of processed binary raster signals g1 and g2 respectively, generated by the first conversion operation 5 and the second conversion operation 6, respectively. The selected raster signals are then used in a print step 8 for making a print 9. On the basis of the image signals f also subjected to this, the selection step 4 determines which image areas corresponding to the image signals are suitable for either the first conversion operation 5 or the second conversion operation 6. Switching 7 is determined on the basis of image areas selected in the selection step 4.

The selection step 4 comprises distinguishing the image signals f on the basis of differences in optical densities of adjacent dots. This distinction, which is also often referred to as segmenting, can be achieved in various known ways. Depending on the conversion operation selected, 5 or 6, the selection step 4 may comprise detection of a raster by determining the separate raster dots (EP-A 0 291 000) or by counting the number of black/white transitions (U.S. Pat. No. 4,782,399). The selection step 4 may also comprise the detection of contrasts by determining a maximum contrast in an analysis area (EP-A 0 318 950) or determining the number of contrast transitions. Generally, character areas are distinguished from photograph areas locally and per document by selection step 4. The photograph areas may themselves contain rastered information.

In a simple embodiment, the switching operation 7 can be carried out via a logic switching of AND and OR gates (U.S. Pat. No. 4,742,400) as a result of which, depending on a logic signal obtained by the selection step 4, the processed raster signals g1 or g2 are written automatically and per image element in, for example, a bit map memory provided for printing operation 8.

Figure 2:
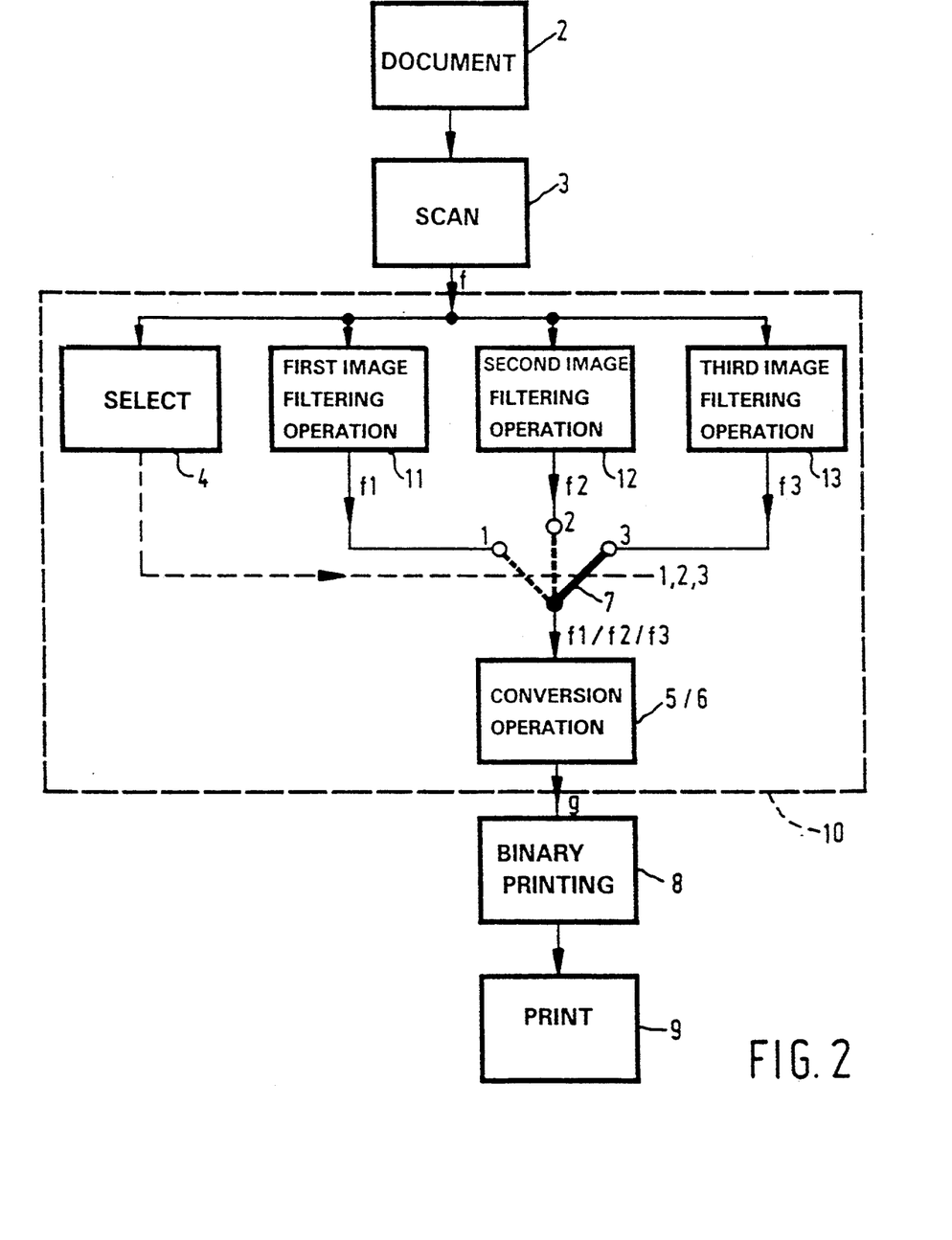
FIG. 2 represents the method according to the present invention for processing image information to give binary print signals.

FIG. 2 shows a method 10 for converting the image signals f to the raster signals g according to the present invention. Just as in FIG. 1, the image signals f are obtained by photoelectrically scanning a document 2 in a scanning step 3. As in the case of the raster signals g1/g2 shown in FIG. 1, the raster signals g are used for making a print 9 in a printing step 8. As in the method 1 shown in FIG. 1, switching 7 is carried out by means of the selection step 4, between different groups of processed image signals. The difference from the known method 1 is that the switching operation 7 now takes place between different groups of image signals f2, f2 and f3 filtered by different image filtering operations 11, 12 and 13. With these image filtering operations 11, 12 and 13, the image signals f supplied and representing gray values are not converted into binary raster signals g representing black/white values, but into filtered gray value signals f1, f2 and f3 correlated to the image signals f supplied. The filtered image signals f1, f2 and f3 selected by the switching operation 7 are then converted, by no more than one conversion operation 5/6, into binary raster signals g. The image filtering operations 11, 12 and 13 so process the image signals f that at least a selection thereof, as determined by the selection step 4, is more suitable for subjecting to one conversion operation 5/6 than a same selection from the original image signals f. Image filtering operations suitable for this purpose are discussed hereinafter.

Figure 3:
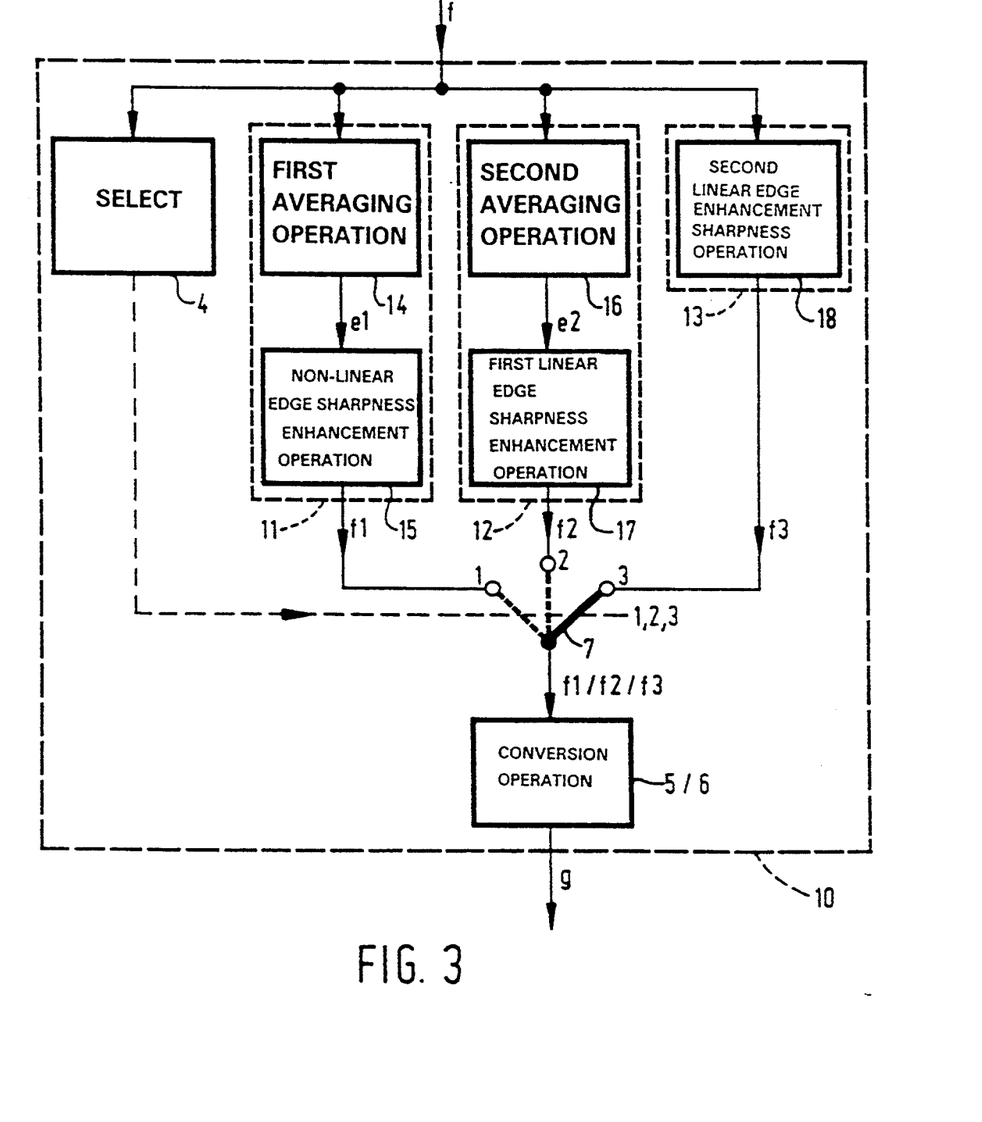
FIG. 3 represents a mode of carrying out the method of FIG. 2.

FIG. 3 represents a first mode of carrying out the method 10 shown in FIG. 2. This particularly indicates a mode of the image filtering operations 11, 12 and 13 in which error diffusion is selected for the conversion operation 5/6. The image filtering operation 11 comprises a first averaging operation 14 and a non-linear edge sharpness enhancement operation 15. The first averaging operation 14 has as its first function the suppression of high-frequency noise, such as, for example, small clusters of high-contrast image dots. A second function is to cause fine rasters from about 28 dots/cm to close up in the diagonal direction. On printing this suppresses moiré effects as a result of the conversion operation 5/6.

A suitable averaging operation 14 is obtained by replacing the corresponding image signal f(i,j) by an average e1(i,j) of a number of neighboring image signals for each image element (i,j), where i and j are the coordinate axes in the main scanning direction and the direction of transit respectively. The algorithm used for this is as follows:

$$e1(i,j) = a1 \cdot \sum_{n=-N}^{n=M} \sum_{m=-N}^{m=N} K(m,n) \cdot f(i+m, j+n) \quad (1)$$

where
— $a1 = \frac{1}{8}$
— $N = 1$ $$K(m,n) = \begin{pmatrix} 1 & 1 & 1 \\ 1 & 0 & 1 \\ 1 & 1 & 1 \end{pmatrix} \quad (2)$$

Here a1 is adjustable and may have a value of between 0 and 2.

The first function of the non-linear edge sharpness enhancement operation 15 is, as much as possible, to cancel out the unsharpness caused by the averaging operation 14 in still distinguishable edge transitions. A second function is to reinforce very weak or low-contrast edge information so that it is not lost in the conversion operation 5/6. The retention of this information accordingly has priority in the image filtering operation 11. Consequently, a non-linear operation is preferred to a linear. Edge transitions will be extra enhanced by the non-linear character. A suitable non-linear processing is in determining for each image element (i,j) a maximum absolute value a(i,j) of differences in the values for e1 of neighboring image elements and adding, for each image element the value a(i,j) thus determined, with a specific weighing factor a2, to the original value e1(i,j) to give the final signal f1(i,j).

Let it be assumed that the part of the image around e1(i,j) is given by the following values (with e1-(i,j)=pc):

$$
\begin{matrix}
. & . & pu & . & . \\
. & . & . & . & . \\
pl & . & pc & . & pr \\
. & . & . & . & . \\
. & . & pd & . & .
\end{matrix} \tag{3}
$$

From this the following mutual differences are determined:

$$
\begin{aligned}
difr &= pc - pr \\
difu &= pc - pu \\
difl &= pc - pl \\
difd &= pc - pd
\end{aligned} \tag{4}
$$

The maximum and minimum differences are then determined:

$$maxdif = FLAX(difr, difu, difl, difd) \tag{5}$$

and $$mindif = MIN(difr, difu, difl, difd)$$

For a(i,j), the following applies:

a(i,j)=maxdif if maxdif>ABS(mindif) mindif if maxdif<ABS(mindif) or (6)

The final signal is then obtained via:

$$f1(i,j) = e1(i,j) + a2 \cdot a(i,j) \tag{7}$$

Here a2 is adjustable and may have a value of between 0 and 2. A value which has been found suitable for a2 is 1.5.

The image filtering operation 12 comprises a second averaging operation 16 and a first linear edge sharpness enhancement operation 17. The second averaging operation 16 provides the same functions as the first averaging operation 14 and is identical thereto except for the parameters. The filtered signals are denoted by e2(i,j). Like the non-linear edge sharpness enhancement operation 15, the first linear edge enhancement operation 17 has the function of cancelling out the unsharpness caused by the second averaging operation 16 in still distinguishable edge transitions. Since the image filtering operation 12 is intended for information with an average contrast, an edge sharpness improvement no longer has the highest priority. Thanks to the average contrast already present, the information is no longer lost on printing. A linear processing is therefore now deliberately selected in order to avoid any distortion, such as a local grey value enhancement at the edges. A suitable processing for this is a Laplace algorithm, which is given by:

$$f2(i,j) = e2(i,j) + a3 \cdot \sum_{k=-N}^{k=N} \sum_{l=-N}^{l=N} e2(i+k, j+l) \cdot K(k,l) \tag{8}$$

where $$N = 2$$

$$K(k,l) = \begin{matrix}
0 & 0 & -1 & 0 & 0 \\
0 & 0 & 0 & 0 & 0 \\
-1 & 0 & 4 & 0 & -1 \\
0 & 0 & 0 & 0 & 0 \\
0 & 0 & -1 & 0 & 0
\end{matrix}$$

Here a3 is adjustable and may assume a value of between 0 and 2.

The third image filtering operation 13 is intended for high-contrast and strong information, for example coarse screens and letters contrasting clearly from the background. To avoid information loss, spatial deformation is inadmissible in this case. The image filtering operation 13 accordingly contains only a second linear edge sharpness enhancement operation 18. The object of this is to enhance the edge sharpness to compensate for a blurring effect of the conversion operation 5/6. Apart from the parameters, a suitable algorithm for this is identical to the algorithm used in the first linear edge sharpness enhancement operation 17.

Other methods coming within the invention are obtained by omitting one of the image filtering operations 11, 12 and 13 described. A method coming within the invention is also obtained by adding a fourth image filtering operation to the three mentioned. To the skilled artisan it is also clear that other alternative algorithms having the same functionality are possible in addition to the algorithms mentioned for averaging and edge sharpness enhancement. Depending on scanner properties, such as resolution or gray value distinguishing power, the expected information content of documents, or the type of conversion operation in relation to the printing properties of a printing system, it may be necessary to adapt the algorithms thereto to retain the same functionality. These algorithms have, for example, proved suitable if the conversion operation 5/6 for printing is based on error diffusion.

In the case of the averaging operations 14 and 16, a different averaging range or a different weighing of values in the averaging range may be selected. In addition, an algorithm based on a different averaging principle, e.g. median filtering, is also possible.

In the case of the non-linear edge sharpness enhancement operation 15, the skilled artisan also has available other non-linear algorithms for edge sharpness enhancement, such as an equally simple non-linear diagonal operation (known as the quadratic Roberts relation):

$$f1(i,j) = \{[e1(i,j) - e1(i+1, j+1)]^2 + [e1(i, j+1) - e1-(i+1,j)]^2\}^{\frac{1}{2}} \tag{9}$$

These and other alternative non-linear edge sharpness enhancement operations are described, for example, in 'Digital Image Processing', William K. Pratt, John Wiley & Sons, New York 1978, page 487 ff. 'Nonlinear Edge Enhancement Methods'. With regard to alternative linear edge sharpness enhancement operations, reference will simply be made here to the above literature.

The operations described can, on the one hand, be completely implemented in software by means of a program in a general purpose computer and, on the other hand, by electronic hardware components such as delay units, comparators, flip-flops, line buffers, multiplexers and the like. Use can also be made of generally available dedicated components for standardized operations. The relevant considerations here are of an economic nature.

Figure 4:
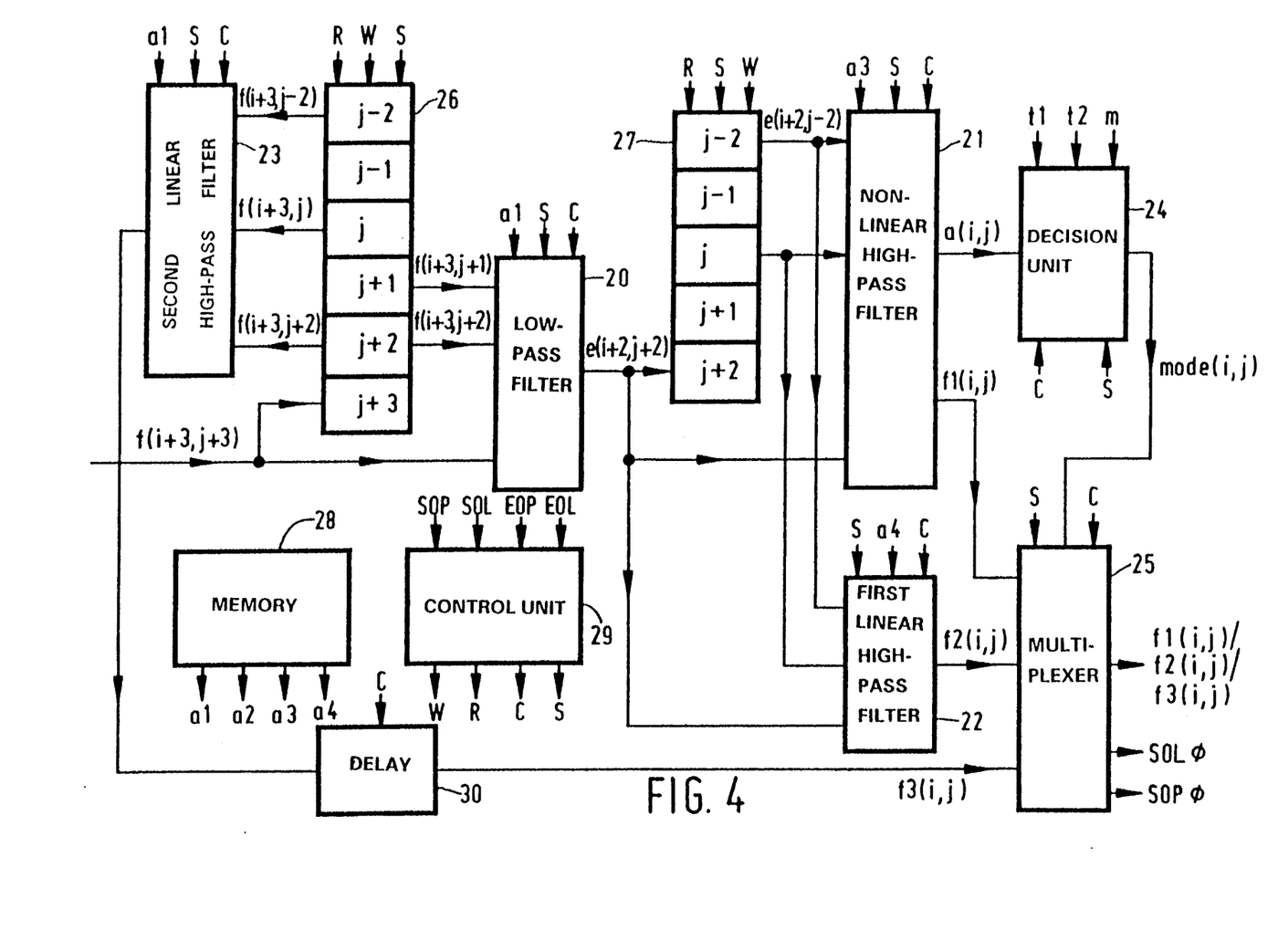
FIG. 4 represents an image selection unit according to the present invention.

FIG. 4 represents an image selection unit according to the present invention. It is suitable for performing the method 10 represented in FIG. 3. A first image filtering unit suitable for performing the image filtering operation 11 is formed by a low pass filter 20 and a non-linear high pass filter 21. A second image filtering unit suitable for performing the image filtering operation 12 is formed again by the low pass filter 20 and a first linear high pass filter 22. A third image filtering unit suitable for performing the image filtering operation 13 is formed by a second linear high pass filter 23. Selection means for performing the selection step 4 is formed by the low pass filter 20, the non-linear high pass filter 21 and a decision unit 24. Switching means for the switching operation 7 is formed by a multiplexer 25.

The low pass filter 20 is suitable for performing the averaging operation according to (1) and (2), the non-linear high pass filter 21 is suitable for performing the non-linear edge sharpness enhancement operation according to (3) to (7) and the first and second linear high pass filters 22 and 23 are suitable for performing the linear edge sharpness enhancement operation according to (8).

The decision unit 24 generates a selection signal mode (i,j), on the basis of which the multiplexer 25 transmits one of the signals f1(i,j), f2(i,j) and f3(i,j) generated by the three image filtering units. The decision unit 24 determines the selection signal mode (i,j) on the basis of the signals a(i,j) generated by the non-linear high pass filter 21 (See (6)). The signal e(i,j) generated by the low pass filter 20 is in these conditions fed both to the non-linear high pass filter 21 and to the first linear high pass filter 22. The non-linear high pass filter 21 thus generates not only the signal f1(i,j) but also the edge signal a(i,j). Signals t1, t2 and m are also fed to the decision unit 24. These signals influence the operation of the decision unit 24. Its operation will be described hereinafter.

The image selection unit also comprises the line buffer units 26 and 27 for storing image signals arranged in lines j. The image signals f(i,j) obtained by scanning are fed line-by-line to the line buffer unit 26 and the low pass filter 20. In this case, first the line with image signals given by j=0, and then the line with j=1, and so on, until the last line is scanned on a page. Within a line the image signals are fed separately in succession. In this case first the image signal with i=0, and then with i=1 and so on, until the last image signal of a scanned line is fed. The same applies to the signals e(i,j). The line buffer unit 26 can store 6 lines and the line buffer unit 27 can store 5 lines.

The image selection unit also comprises a memory unit 28 for storing the parameters a1 to a4 for the filters. A control unit 29 is also provided to generate read and write signals R and W for the line buffer units 26 and 27, to generate clock signals C for synchronising the input and output from the filters, the decision unit 24 and multiplexer 25, and to generate general control signals S for initialization. For this initialization, page and line start/stop signals originating from a scanner, e.g. SOP (Start Of Page), SOL (Start Of Line), EOL (End Of Line) and EOP (End Of Page), are fed to the control unit 29. All the units are initialized with a SOP. This means, for example, that external signals, such as t1, t2 and m, are collected and that the parameters a1 to a4 are placed in registers intended for the purpose. Certain registers are also reset. SOL starts the processing of the image signals while EOL concludes the operation for a line, taking edges into account. The image selection unit is rendered inactive with an EOP. Finally, a delay unit 30 is also provided for delaying a supplied image signal f3(i,j) over one clock signal C.

The multiplexer 25 also generates a new SOL0 and SOP0 signal to indicate to a following unit (a conversion or halftoning unit in this case) that a filtered line or filtered page respectively is available. There is a functional delay between the filters represented in FIG. 4. For example, if an image signal f(i+3,j+3) is fed to the low pass filter 20, it will be engaged on calculating e(i+2,j+2), the filter 23 on f3(i+1,j), the filter 21 on a(i,j) and f1(i,j) and the filter 22 on f2(i,j). A delay in the decision unit 24 is compensated by extra delay units (not shown) between the outputs of the filters 21, 22, 23 and the multiplexer 25.

The input signal f, e.g. f(i+3,j+3) is fed to the line buffer unit 26 and to the low pass filter 20. The storage in and reading out from the line buffer unit 26 are controlled by the read signal R and write signal W originating from the control unit 29. To limit the number of memory accesses, reading and writing is carried out column-wise. Thus, for a specific value of i corresponding to an address generated by the control unit 29, the different line buffers of the line buffer unit 26 are read and written in parallel.

At a time determined by the clock signal C the low pass filter 20 reads from the line buffer unit 26 the image signals f(i+3,j+1) and f(i+3,j+2), and directly receives f(i+3,j+3). The low pass filter 20 itself generates the signal e(i+2,j+2) which is fed directly to the non-linear high pass filter 21 and the first linear high pass filter 22. Again, at the time determined by the clock signal C, the non-linear high pass filter reads the image signals e(i+2,j−2) and e(i+2,j) from the line buffer unit 27 and itself generates the signals a(i,j) and f1(i,j). The first linear high pass filter 22 again at the same time reads from the line buffer unit 27 the signals e(i+2,j−2) and e(i+2,j) and itself generates the signal f2(i,j). The second linear high pass filter 23 at the same time reads from the line buffer memory 26 the signals f(i+3,j−2), f(i+3,j) and f(i+3,j+2) and itself generates the signal f3(i+1,j) which is fed to the multiplexer 25 via the delay unit 30, a following clock signal C later. The line buffer units 26 and 27 thus compensate for the functional delays imposed by the algorithms used. In addition, there also may be hardware-determined delays which will also have to be taken into account.

Figure 5:
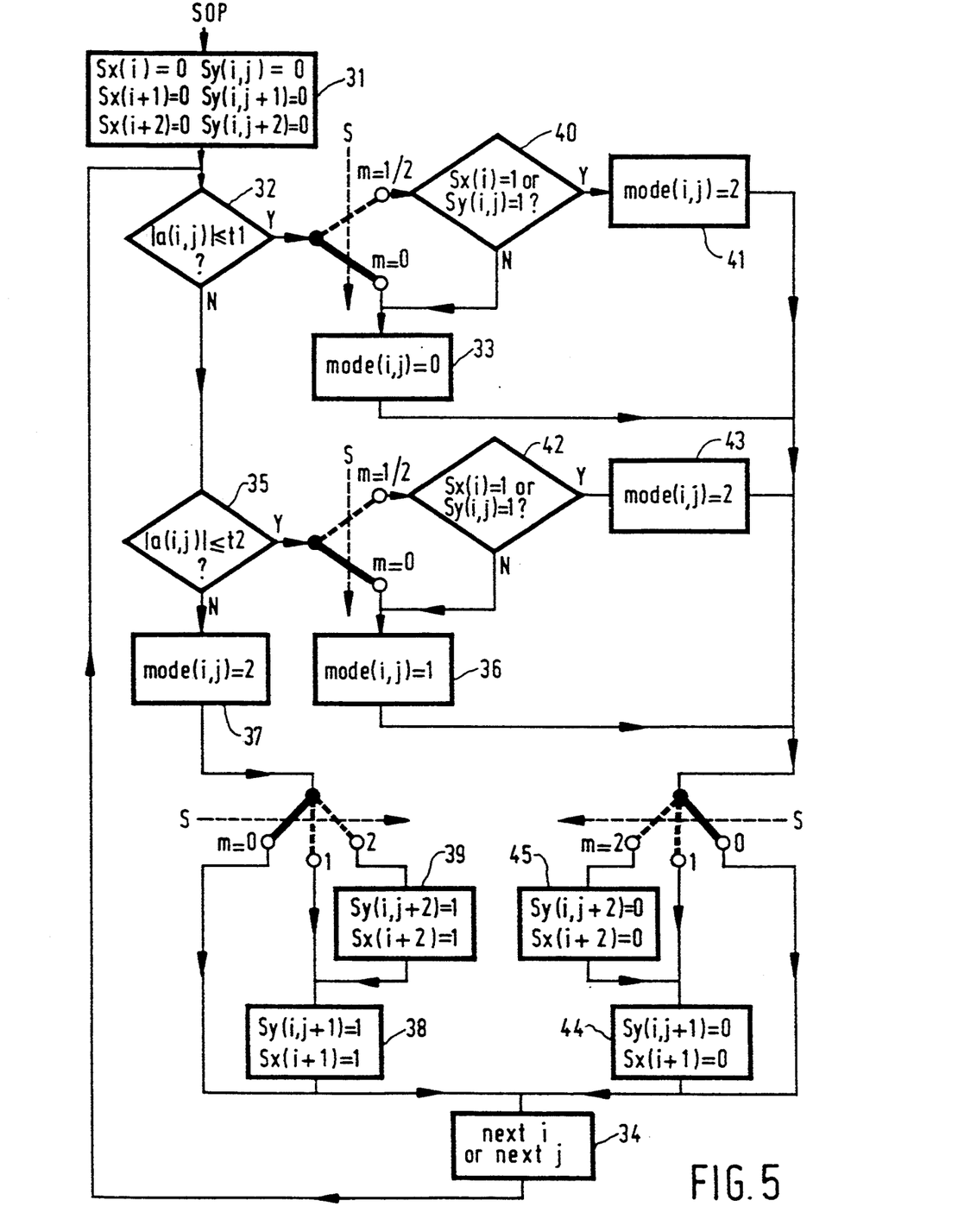
FIG. 5 represents the operation of a decision unit contained in the image selection unit of FIG. 4.

A flow diagram FIG. 5 describes the operation of the decision unit 24 from FIG. 4. This unit compares the supplied edge signals a(i,j) with the adjustable threshold values t1 and t2 and on the basis thereof, decides the value of the output signal mode(i,j). In the case of mode(i,j)=0, mode(i,j)=1, and mode(i,j)=2, f1(i,j), f2(i,j) and f3(i,j) are respectively selected by the multiplexer 25. Depending on the value of the adjustable parameter m the decision unit 24 can operate in three different modes.

After the start of page signal SOP, internal status registers are first set to zero in an initialization step 31. These status registers comprise status registers Sx(i) related to the main scanning direction x, where i is the index of consecutive scan lines, and status registers Sy(i,j) related to an image dot j on a scan line i. A decision process to be described hereinafter is then carried out for each combination of i and j. Depending on the value of the adjustable parameter m, this decision process can be performed in three different ways. This is embodied in the diagram by the position of a switch S which can occupy three different positions depending on the value of m. The decision process will first be described with the switch S in the position illustrated where m=0.

In a comparison step 32 the absolute value of an edge signal a(i,j) fed to the decision unit 24 and corresponding to the image dot i,j is compared with the threshold value t1. If the absolute value of a(i,j) is less than t1, the output signal mode(i,j) 33 is allocated the value 0. The value of i or j is then raised in a raise step 34, after which the comparison step 32 is again carried out. If the absolute value of a(i,j) is greater than the threshold value t1, a check is made in the comparison step 35 as to whether the absolute value of a(i,j) is still below the threshold value t2, with t2 being greater than t1. If this is the case, the output signal mode(i,j) 36 is allocated the value 1 after which the decision process continues with a new combination of i and j. If the absolute value of a(i,j) is even greater than t2, the output signal mode(i,j) 37 is allocated the value 2.

In the adjustable mode of the decision unit 24 indicated by m=0, the selection of a filtered image signal corresponding to an image dot i,j is thus determined solely by the value of the edge signal corresponding to that image dot i,j. In the second and third modes indicated by m=1 and m=2 respectively, the selection is in addition also determined by the value of the edge signal of adjacent dots. In these modes, the status registers Sx and Sy are used for this purpose. In the mode with m=1, the status registers Sx(i+1) and Sy(i,j+1) 38 are given the value 1 if the absolute value of the edge signal a(i,j) is greater than t2. In the mode with m=2, the status registers Sx(i+2) and Sy(i,j) 39 additionally are given the value 1.

In a subsequent decision process for a subsequent combination of i and j, if the absolute value of a(i,j) is less than t1, a check is made in a control step 40 as to whether Sx(i) or Sy(i,j) have the value 1. If so, the output signal mode(i,j) 41 is allocated the value 2 instead of 0. If the absolute value of a(i,j) is greater than t1, but smaller than t2, the output signal mode(i,j) 43 is also allocated the value 2 via a control step 42 identical to 40.

After allocation of a value to mode(i,j) in the mode where m=1, the status registers Sy(i,j+1) and Sx(i+1) 44 are set to 0. In the mode with m=2, the status registers Sy(i,j+2) and Sx(i+2) 45 are in addition also set to 0. In the modes with m=1 and m=2, the value 2 is thus always allocated to the output signal mode(i,j) if an edge signal in one of the adjacent image dots and corresponding to these dots is greater than t2.

The choice with regard to those neighboring elements whose status has to be updated by means of status registers has been optimized for the embodiment described. The skilled artisan may find another choice the optimal choice for a different embodiment.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A method of processing a series of image signals obtained by photoelectrically scanning a document, wherein each image signal represents the optical density of an image dot on the document, comprising:

generating a selection signal by reference to said series of image signals, the value of said selection signal being dependent upon differences between optical densities of adjacent image dotes;

performing at least two mutually different image processing operations on said series of image signals, each image processing operation yielding a group of processed image signals; and selecting, by reference to said selection signal, processed image signals from one of said groups of processed image signals, wherein said at least two image processing operations are image filtering operations and the processed image signals are filtered image signals, the selected filtered image signals being subjected to one and the same conversion operation for converting multi-value image signals into binary raster signals suitable for printing by a printing device, at least one of said at least two image filtering operations comprising successively an averaging operation and an edge sharpness enhancement operation.

2. A method according to claim 1, wherein at least one of said at least two image filtering operations further comprises successively an averaging operation and a non-linear edge sharpness enhancement operation.

3. A method according to claim 1, wherein at least one of said at least two image filtering operations comprises successively an averaging operation and an edge sharpness enhancement operation and at least one of said at least two image filtering operations comprises successively an averaging operation and a non-linear edge sharpness enhancement operation.

4. A method according to claim 1, wherein at least one of said at least two image filtering operations comprises an edge sharpness enhancement operation and at least one of said at least two image filtering operations comprises successively an averaging operation and an edge sharpness enhancement operation.

5. A method according to claim 1, wherein at least one of said at least two image filtering operations comprises an edge sharpness enhancement operation and at least one of said at least two image filtering operations comprises successively an averaging operation and a non-linear edge sharpness enhancement operation.

6. A method according to claim 1, wherein at least one of said image filtering operations includes an averaging operation and an edge sharpness enhancement operation, at least one of said image filtering operations includes an averaging and a non-linear edge sharpness enhancement operation and at least one of said image filtering operations includes an edge sharpness enhancement operation.

7. A method according to claims 1, 2 or 3, wherein said averaging operation comprises substituting the value of an image signal corresponding to an image dot by a sum of the values of the image signals corresponding to the image dots adjoining said image dot, said sum being weighted by a first weighing factor.

8. Method according to claims 1, 4 or 5, wherein said edge sharpness enhancement operation comprises substituting the value of an image signal corresponding to an image dot by a Laplace filtering operation result weighted by a second weighing factor.

9. A method according to claims 2 or 3, wherein said non-linear edge sharpness enhancement operation comprises substituting the value of an image signal corresponding to an image dot by a maximum absolute difference in value of image signals corresponding to adjacent image dots with respect to the value of the image signal corresponding to the image dot, said maximum absolute difference being weighted by a third weighing factor.

10. A scan/print system comprising:
a scanning unit for obtaining multi-value image signals by photoelectrically scanning a document, wherein a value of a multi-value image signal represents the optical density of an image dot on the document;
a print unit for printing binary image signals; and
an image selection unit including an image processing unit for processing a series of said multi-value image signals fed thereto, said image processing unit generating at least two mutually different groups of processed image signals, a selection means for generating a selection signal by reference to said multi-value image signals which are to be fed to said selection means, the value of the selection signal being dependent upon differences between optical densities of adjacent image dots, and switching means for selecting, by reference to said selection signal, processed image signals from one of said at least two groups of processed image signals, wherein said image processing unit is constructed as an image filtering unit comprising at least a low pass filter and a linear high pass filter in series coupled thereto and said generated groups of processed image signals are groups of filtered image signals, the selected filtered image signals being fed to one and the same conversion unit contained in the scan/print system for converting multi-value image signals into binary image signals.

11. A scan/print system according to claim 10, wherein said image filtering unit further comprises a low pass filter and a non-linear high pass filter coupled thereto.

12. A scan/print system according to claim 10, wherein said image filtering unit comprises said low pass filter and linear high pass filter coupled thereto for generating at least one of said groups of filtered image signals, a low pass filter and a non-linear high pass filter coupled thereto for generating at least one of said groups of filtered image signals and a high pass filter for generating at least one of said groups of filtered image signals.

13. A scan/print system according to claims 10, 11 or 12, wherein said selection means comprises a low pass filter and edge detection means connected thereto, such that said edge detection means generates edge signals which represent a maximum absolute difference in value of image signals fed to said edge detection means within a series and said selection means further comprises a decision unit which generates the selection signal and to which the edge signals are fed.

14. A scan/print system according to claim 11, wherein said selection means comprises a decision unit generating said selection signal for selecting filtered image signals from the low pass filter and the non-linear high pass filter coupled thereto, if the value of an edge signal supplied is below a threshold value.

15. A scan/print system according to claim 11, wherein said selection means comprises a decision unit generating said selection signal for selecting filtered image signals from said high pass filter, if the value of an edge signal supplied is above a threshold voltage.

16. A scan/print system according to claims 10, 11 or 12, wherein said selection means comprises a decision unit for generating the selection signal for selecting 1) filtered image signals from the low pass filter and the non-linear high pass filter coupled thereto, if the value of the edge signal supplied is below a first threshold value, 2) filtered image signals from the low pass filter and the high pass filter coupled thereto, if the value of the edge signal supplies is above the first threshold value and below a second threshold value, or 3) filtered image signals from the high pass filter if the value of the edge signal supplied is above the second threshold value.

17. An image selection unit as applied in a scan/print system according to claims 10, 11, 12, 14 or 15.

18. An image selection unit as applied in a scan/print system according to claim 13.

19. An image selection unit as applied in a scan/print system according to claim 16.

20. A scan/print system according to claim 10, wherein said image filtering unit comprises a low pass filter and a linear high pass filter coupled thereto and a low pass filter and a non-linear high pass filter coupled thereto.

21. A scan/print system according to claim 10, wherein said image filtering unit comprises a low pass filter and a linear high pass filter coupled thereto and a high pass filter.

22. A scan/print system according to claim 10, wherein said image filtering unit comprises a low pass filter and a non-linear high pass filter coupled thereto and a high pass filter.

* * * * *